(12) United States Patent
Tsutsumi (10) Patent No.: US 9,768,716 B2
(45) Date of Patent: Sep. 19, 2017

(54) MOTOR CONTROL APPARATUS PROVIDED WITH MAGNETIC FLUX CONTROL UNIT, AND MACHINE LEARNING APPARATUS AND METHOD THEREOF

(71) Applicant: FANUC CORPORATION, Yamanashi (JP)

(72) Inventor: Tomohisa Tsutsumi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/241,002

(22) Filed: Aug. 18, 2016

(65) Prior Publication Data

US 2017/0063261 A1 Mar. 2, 2017

(30) Foreign Application Priority Data

Aug. 27, 2015 (JP) .................. 2015-167875

(51) Int. Cl.
| | |
|---|---|
| *H02P 6/08* | (2016.01) |
| *H02P 6/14* | (2016.01) |
| *H02P 27/06* | (2006.01) |
| *H02P 23/12* | (2006.01) |
| *H02P 23/14* | (2006.01) |
| *G06N 99/00* | (2010.01) |

(52) U.S. Cl.
CPC ............. *H02P 6/08* (2013.01); *H02P 6/14* (2013.01); *H02P 23/12* (2013.01); *H02P 23/14* (2013.01); *H02P 27/06* (2013.01); *G06N 99/005* (2013.01)

(58) Field of Classification Search
CPC ........................................................ H02P 6/08
USPC ................................ 318/798, 767, 727
See application file for complete search history.

(56) References Cited

U.S. PATENT DOCUMENTS

| | | | | |
|---|---|---|---|---|
| 7,772,790 | B2 * | 8/2010 | Nashiki ............... | H02K 1/145 |
| | | | | 318/400.02 |
| 8,044,633 | B2 * | 10/2011 | Tatematsu ........... | B60L 11/1803 |
| | | | | 318/139 |

FOREIGN PATENT DOCUMENTS

| | | |
|---|---|---|
| JP | 2-131387 A | 5/1990 |
| JP | 2003-44102 A | 2/2003 |
| JP | 2004-178492 A | 6/2004 |
| JP | 2007-164406 A | 6/2007 |
| JP | 2008-306798 A | 12/2008 |
| JP | 2011-254596 A | 12/2011 |
| JP | 2013-225192 A | 10/2013 |
| JP | 2014-166054 A | 9/2014 |

(Continued)

*Primary Examiner* — David S Luo
(74) *Attorney, Agent, or Firm* — Hauptman Ham, LLP (57) ABSTRACT

A machine learning apparatus configured to learn conditions to be associated with an excitation current command for a motor and excitation start timing provided by a motor control apparatus includes: a state observation unit that observes a state variable including at least one of data relating to magnetic flux increase lead time that may be required from timing when a start command is issued for a predetermined operation mode until the magnetic flux of the motor reaches the maximum magnetic flux corresponding to the predetermined operation mode and data relating to whether an overheat alarm indicating that the motor has overheated has been triggered or not; and a learning unit that learns conditions to be associated with an excitation current command increment and an excitation start timing adjusting amount in accordance with a training data set composed of the state variable.

9 Claims, 6 Drawing Sheets

(56) References Cited

FOREIGN PATENT DOCUMENTS

JP  2014-187778 A  10/2014

\* cited by examiner

MOTOR CONTROL APPARATUS PROVIDED WITH MAGNETIC FLUX CONTROL UNIT, AND MACHINE LEARNING APPARATUS AND METHOD THEREOF

RELATED APPLICATIONS

The present application claims priority to Japanese Patent Application No. 2015-167875 filed Aug. 27, 2015, the disclosure of which is hereby incorporated by reference herein in its entirety.

BACKGROUND OF THE INVENTION

1. Field of the Invention

The present invention relates to a motor control apparatus provided with a magnetic flux control unit, and a machine learning apparatus and a method thereof.

2. Description of the Related Art

An induction motor is configured to cause a primary current to flow in a stator to generate a rotating magnetic field and allow a rotor to cut a magnetic flux generated by the rotating magnetic field so that voltage is induced in the rotor and a secondary current flows, and cause a torque to be generated by an interaction between the secondary current and the magnetic flux. In the related art, vector control, which is a method of controlling the primary current to be passed through the stator by dividing into an excitation current, flowing in a direction of a magnetic flux, and the secondary current, i.e., a torque current is employed as a method of controlling the induction motor. Generated torque is proportional to a product of the magnetic flux generated by the excitation current and the torque current.

Although a magnitude of the magnetic flux in the induction motor in a steady state is proportional to the excitation current generating the magnetic flux, when causing the magnetic flux to vary in association with a variation in load applied to the induction motor and operating conditions, the magnetic field varies with a primary delay with respect to the variation in excitation current.

Figure 8:
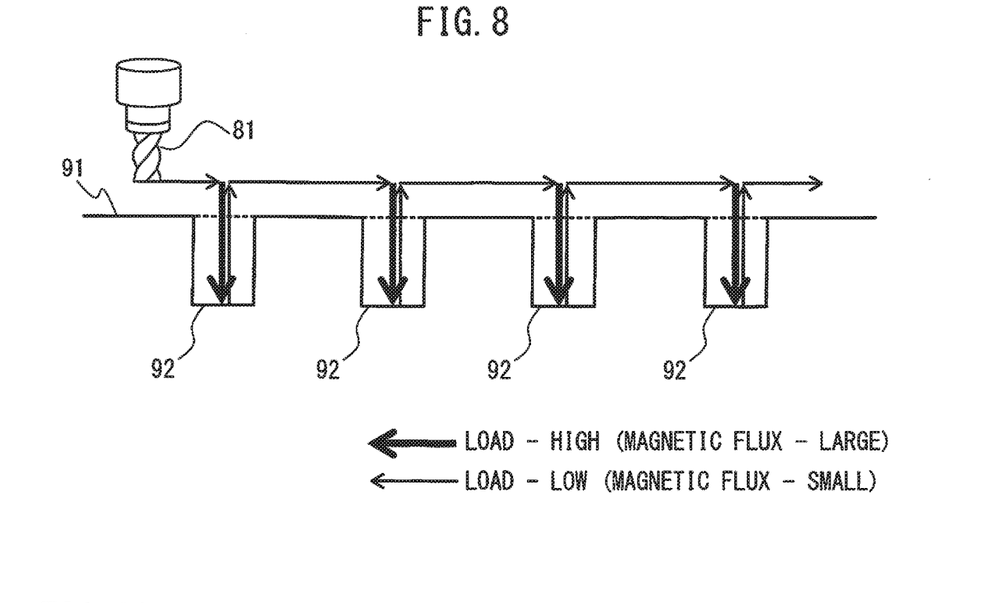
FIG. 8 is an explanatory drawing illustrating a load applied to the induction motor that drives a drilling machine.
Figure 9A:
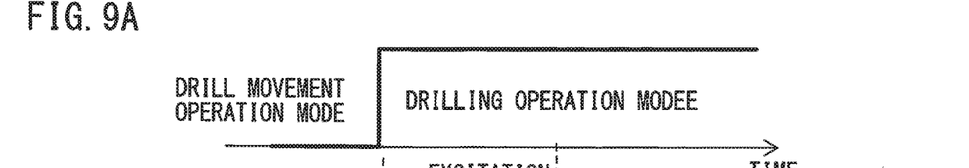
FIG. 9A is a drawing depicting an operation mode, an excitation current, and a magnetic flux in the induction motor that drives the drilling machine in FIG. 8, and illustrating an operation mode (drilling) of the induction motor.
Figure 9B:
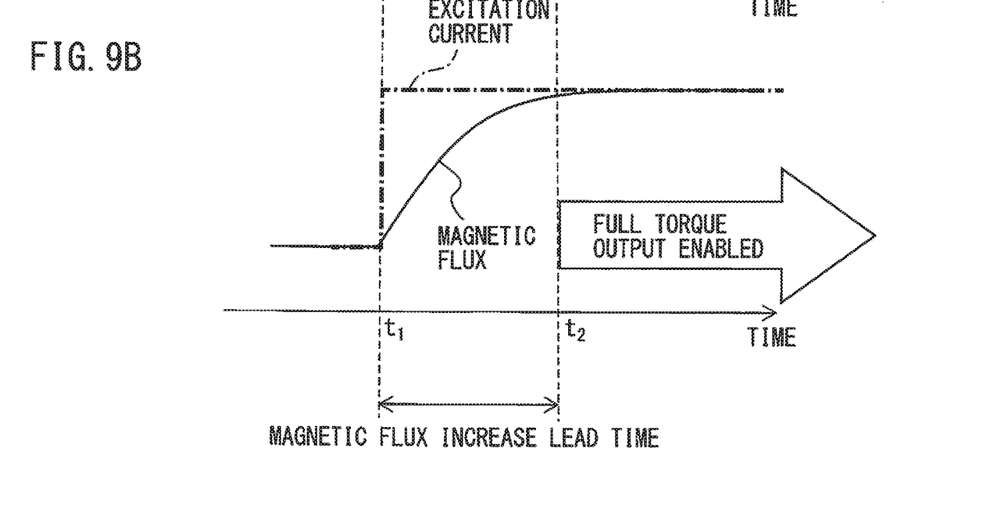
FIG. 9B is a drawing depicting the operation mode, the excitation current, and the magnetic flux in the induction motor that drives the drilling machine in FIG. 8, and illustrating an excitation current flowing in the induction motor and a magnetic flux that is generated by the excitation current.

FIG. 8 is an explanatory drawing illustrating a load applied to an induction motor that drives a drilling machine. FIG. 9A is a drawing depicting an operation mode, an excitation current, and a magnetic flux in the induction motor that drives the drilling machine in FIG. 8, and illustrating an operation mode (drilling) of the induction motor. FIG. 9B is a drawing depicting the operation mode, the excitation current, and the magnetic flux in the induction motor that drives the drilling machine in FIG. 8, and illustrating an excitation current flowing in the induction motor and a magnetic flux that is generated by the excitation current. A load applied to the induction motor (not illustrated) that drives a drilling machine 81 when the drilling machine 81 forms a hole 92 in a member 91 (a drilling operation mode) is larger than a load applied to the induction motor (not illustrated) that drives the drilling machine 81 when pulling out a drill of the drilling machine 81 from the hole 92 after the drilling has terminated or when moving the drilling machine 81 to a subsequent point of drilling (a drill movement operation mode). Therefore, when the drilling machine 81 forms the hole 92 in the member 91, the operation mode of the induction motor is switched from the drill movement operation mode to the drilling operation mode so as to cope with a high load. As illustrated in FIG. 9A, when switching the induction motor that drives the drilling machine 81 to the drilling operation mode at time $t_1$ for the drilling with the drilling machine 81, excitation is started at time $t_1$, for which an excitation current command for the corresponding drilling operation mode is output from the motor control apparatus (not illustrated) and, accordingly, the excitation current (illustrated by a dot-and-dash line) for the corresponding drilling operation mode as illustrated in FIG. 9B flows in the induction motor. However, since the magnetic flux (illustrated by a solid line) that is generated by the excitation current varies with a primary delay having, as a time constant, a circuit constant of the induction motor with respect to the excitation current, for example, a period "$t_2$-$t_1$" may be needed until the torque that may be required for the drilling reaches the maximum magnetic flux with which the drilling may need a full torque from the start of the excitation at time $t_1$, where clock $t_2$ is time when the maximum magnetic flux with which the drilling may need the full torque occurs.

Since the magnetic flux of the induction motor is established with a delay with respect to the excitation current in this manner, if current control is performed without considering the primary delay, the torque varies discontinuously with a variation in magnetic flux at the time of acceleration or deceleration of the induction motor, so that a transient phenomenon that a velocity waveform swells may occur. Therefore, in the control of the induction motor, quick increase and change of a magnetic flux corresponding to a variation in load and operation condition may be demanded.

For example, as described in Japanese Unexamined Patent Publication No. 2008-306798, as a method of controlling a motor for expediting the increase of the magnetic flux, there is a technology of passing an excitation current not lower than a rated current from a time point when timing to start increasing magnetic flux is reached such as switching of the operation mode.

However, according to the invention descried in Japanese Unexamined Patent Publication No. 2008-306798, since the magnetic flux is increased from a time point when timing to start increasing the magnetic flux is reached, lead time for the magnetic flux to be increased to the desired level (hereinafter, referred to as "magnetic flux increase lead time") cannot be completely eliminated.

In addition, easy and optimum control of the magnetic flux of induction motors, which may be driven in various operating patterns, is still widely desired.

SUMMARY OF INVENTION

In view of the problems as described above, it is an object of the invention to provide a motor control apparatus that controls a magnetic flux of an induction motor in an optimum fashion and is capable of eliminating lead time for the magnetic flux to be increased, and a machine learning apparatus used for the motor control apparatus and a method thereof.

In order to achieve the above-described object, a machine learning apparatus configured to learn conditions that are associated with an excitation current command for magnetic flux control of a motor performed by a motor control apparatus and excitation start timing, which corresponds to timing to start increasing a magnetic flux by the magnetic flux control includes: a state observation unit that observes a state variable including at least one of data relating to magnetic flux increase lead time, which corresponds to time that may be required from timing when a start command is issued for a predetermined operation mode until the magnetic flux of the motor reaches the maximum magnetic flux corresponding to the predetermined operation mode and data relating to whether an overheat alarm indicating that the motor has overheated has been triggered or not; and a learning unit that learns conditions that are associated with an excitation current command increment to be added to the excitation current command for the motor, which is preset for an operation mode before execution of the predetermined operation mode, and an excitation start timing adjusting amount for adjusting the excitation start timing, which is preset for the predetermined operation mode, in accordance with a training data set including the state variables.

The learning unit may include a reward computation unit that computes a reward based on the state variable, and a function update unit that updates a function for changing the excitation current command increment and the excitation start timing adjusting amount based on the reward.

The reward computation unit may be configured to increase the reward when the magnetic flux increase lead time observed by the state observation unit falls within specified time when the state observation unit observes that no overheat alarm has been triggered.

The reward computation unit may be configured to reduce the reward when the magnetic flux increase lead time observed by the state observation unit is out of the specified time.

The reward computation unit may be configured to reduce the reward when the fact that the overheat alarm has been triggered is observed after the predetermined operation mode has started.

The learning unit may be configured to learn conditions in accordance with the training data set acquired for a plurality of the motor control apparatuses.

A motor control apparatus provided with the machine learning apparatus described above further includes: an operation mode command input unit that receives an input of a start command for the predetermined operation mode; a current detection unit that detects actual current flowing in the motor, a magnetic flux computation unit that computes a magnetic flux of the motor from the actual current of the motor detected by the current detection unit; a temperature measurement unit that measures a temperature of the motor; an alarm output unit that outputs an overheat alarm when the temperature measured by the temperature measurement unit reaches an overheat temperature; a time measurement unit that measures the magnetic flux increase lead time; a magnetic flux control unit that performs magnetic flux control for causing the magnetic flux of the motor computed by the magnetic flux computation unit to follow the maximum magnetic flux corresponding to the predetermined operation mode; and a decision-making unit that decides the excitation current command increment and the excitation start timing adjusting amount in response to an input of the current state variable based on the result of learning that the learning unit has learned in accordance with the training data set, and the magnetic flux control unit performs the magnetic flux control based on a command obtained by adding the excitation current command increment decided by the decision-making unit to the excitation current command and on excitation start timing adjusted by the excitation start timing adjusting amount decided by the decision-making unit.

The learning unit may be configured to update conditions by re-learning the conditions in accordance with an additional training data set including the current state variable.

A machine learning method configured to learn conditions that are associated with an excitation current command for magnetic flux control of a motor performed by a motor control apparatus and excitation start timing, which corresponds to timing to start activation of a magnetic flux by the magnetic flux control includes: a state observation step for observing a state variable including at least one of data relating to magnetic flux increase lead time that may be required from timing when a start command is issued for a predetermined operation mode until the magnetic flux of the motor reaches the maximum magnetic flux corresponding to the predetermined operation mode and data relating whether an overheat alarm indicating that the motor has overheated has been triggered or not; and a learning step for learning conditions that are associated with an excitation current command increment to be added to the excitation current command for the motor, which is preset for an operation mode before execution of the predetermined operation mode, and an excitation start timing adjusting amount for adjusting the excitation start timing, which is preset for the predetermined operation mode, in accordance with a training data set including the state variables.

BRIEF DESCRIPTION OF THE DRAWINGS

The invention will be understood more clearly by referring to the following accompanying drawings.

DETAILED DESCRIPTION

A motor control apparatus provided with a magnetic flux control unit, and a machine learning apparatus and a method thereof will be described below with reference to the drawings. It should be understood that the present invention is not limited to the drawings or embodiments described below.

Figure 1:
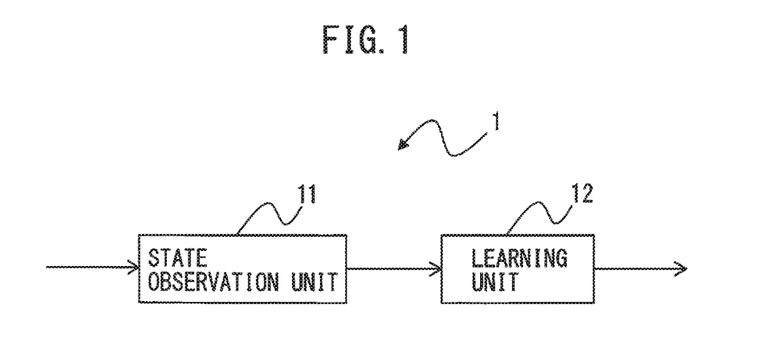
FIG. 1 is a block diagram illustrating a principle of a machine learning apparatus according to an embodiment.

FIG. 1 is a block diagram illustrating a principle of a machine learning apparatus according to an embodiment. Components assigned with the same reference numerals are meant to have the same functions throughout the drawings.

A machine learning apparatus 1 of the embodiment is configured to learn conditions that are associated with an excitation current command for magnetic flux control of a motor performed by the motor control apparatus and excitation start timing, which corresponds to timing to start increasing a magnetic flux by the magnetic flux control.

The machine learning apparatus 1 includes a state observation unit 11 and a learning unit 12.

The state observation unit 11 observes, as a training data set, a state variable including at least one of data relating to magnetic flux increase lead time that may be required from timing when a start command is issued for a predetermined operation mode until the magnetic flux of the motor reaches the maximum magnetic flux corresponding to the predetermined operation mode and data relating whether an overheat alarm indicating that the motor has overheated has been triggered or not. The maximum magnetic flux is a magnetic flux that causes the induction motor to be driven to generate full torque.

The learning unit 12 learns an excitation current command increment to be added to the excitation current command for the motor, which is preset for an operation mode before execution of the predetermined operation mode, and an excitation start timing adjusting amount for adjusting the excitation start timing, which is preset for the predetermined operation mode, in accordance with a training data set including the state variables. The training data set may be acquired from a plurality of the motor control apparatuses and, in this case, the learning unit 12 learns the excitation current command increment and the excitation start timing adjusting amount in accordance with the training data set that is acquired for the plurality of motor control apparatuses.

Figure 2A:
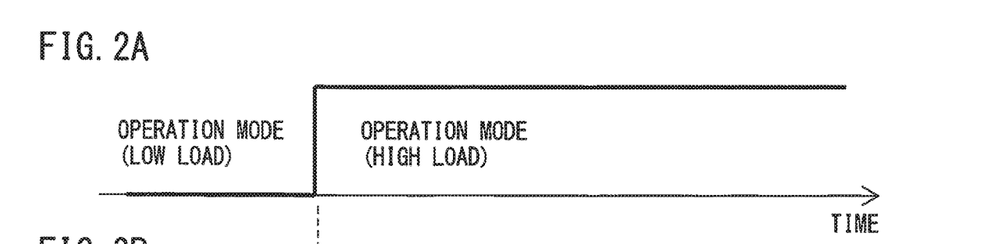
FIG. 2A is an explanatory drawing depicting an operation principle of the machine learning apparatus according to the embodiment, and illustrating an operation mode of an induction motor.
Figure 2B:
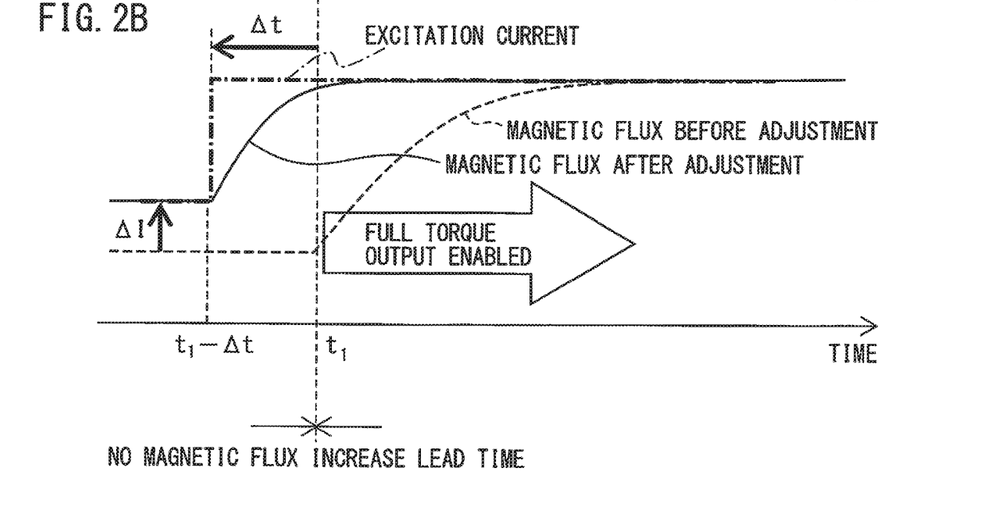
FIG. 2B is an explanatory drawing depicting the operation principle of the machine learning apparatus according to the embodiment, and illustrating an excitation current flowing in the induction motor and a magnetic flux generated by the excitation current.

FIG. 2A is an explanatory drawing depicting an operation principle of the machine learning apparatus according to the embodiment, and illustrating an operation mode of an induction motor. FIG. 2B is an explanatory drawing depicting the operation principle of the machine learning apparatus according to the embodiment, and illustrating an excitation current flowing in the induction motor and a magnetic flux generated by the excitation current.

As described already, the magnetic flux generated by the excitation current flowing in the induction motor varies with a primary delay having, as a time constant, a circuit constant of the induction motor with respect to the excitation current. In the embodiment, considering the primary delay of the magnetic flux, the excitation start timing is adjusted by starting excitation before a time point when the operation mode of the induction motor is switched from a low-load operation mode to a high-load operation mode so that the maximum magnetic flux which may provide the full torque is obtained at a time point when the operating mode is switched to the high-load operation mode, and also the excitation current command for the low-load operation mode, which is to be executed before the high-load operation mode. The operation will be described specifically below.

As illustrated in FIG. 2A, a case where the operation mode of the induction motor is switched from the low-load operation mode to the high-load operation mode at time $t_1$ will be considered. The excitation start timing is set in advance to be the same as timing when the operation mode is switched from the low-load operation mode to the high-load operation mode (i.e. time $t_1$) in general, while in the embodiment, the excitation is started at time $\Delta t$ prior to time $t_1$ when the operation mode of the induction motor is switched from the low-load operation mode to the high-load operation mode to generate the maximum magnetic flux which provides the full torque at a time when the operation mode is switched to the high-load operation mode, so that the magnetic flux increase lead time is eliminated as illustrated in FIG. 2B. In other words, the excitation start timing preset for the high-load operation mode is adjusted by using the excitation start timing adjusting amount $\Delta t$. Furthermore, in the embodiment, the excitation current command in the low-load operation mode which is executed before the high-load operation mode is set to be $\Delta I$ higher than the excitation current command preset for the low-load operation mode to increase the amount of excitation current flowing in the induction motor is increased to be larger than that of the related art in the low-load operation mode and shorten time until the maximum magnetic flux corresponding to the high-load operation mode is achieved. In other words, $\Delta I$ is set as the excitation current command increment, and is added to the excitation current command in the low-load operation mode which is executed before the high-load operation mode. In FIG. 2B, the excitation current flowing in the induction motor is indicated by a dot-and-dash line, the magnetic flux after adjustment to which the invention is applied is indicated by a solid line, and the magnetic flux before the adjustment to which the invention is not applied is indicated by a broken line.

In the embodiment, the excitation current command increment $\Delta I$ to be added to the excitation current command for the motor, which is preset for the operation mode (low-load operation mode) before executing the above-described predetermined operation mode (high-load operation mode) and the excitation start timing adjusting amount $\Delta t$ for adjusting the excitation start timing, which is preset for the predetermined operating mode (high-load operation mode), are adjusted by the machine learning apparatus 1 by learning by itself, so that the magnetic flux increase lead time is eliminated and the magnetic flux of the induction motor is optimized.

Figure 3:
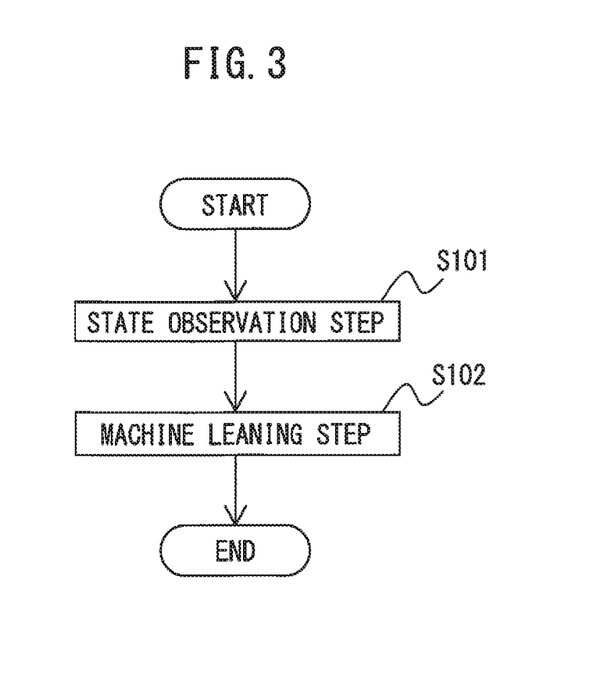
FIG. 3 is a flowchart illustrating an operation flow of a machine learning method according to the embodiment.

FIG. 3 is a flowchart illustrating an operation flow of a machine learning method according to the embodiment. The machine learning method configured to learn conditions that are associated with an excitation current command for magnetic flux control of a motor performed by a motor control apparatus and excitation start timing, which corresponds to timing to start increasing a magnetic flux by the magnetic flux control, includes a state observation step S101 and a machine learning step S102.

The state observation step S101 is executed by the state observation unit 11 and, i.e., the state variable including at least one of the data relating to the magnetic flux increase lead time that may be required from timing when the start command is issued for the predetermined operation mode until the magnetic flux of the motor reaches the maximum magnetic flux corresponding to the predetermined operation mode and the data relating to whether the overheat alarm indicating that the motor has overheated has been triggered or not is observed.

The machine learning step S102 is executed by the learning unit 12, and conditions that are associated with the excitation current command increment $\Delta I$ to be added to the excitation current command for the motor, which is preset for the operation mode before execution of the predetermined operation mode, and the excitation start timing adjusting amount Δt for adjusting the excitation start timing, which is preset for the predetermined operation mode, in accordance with the training data set including the state variables are learned.

A learning algorithm used by the learning unit 12 may be of any type. For example, a case where Reinforcement Learning is applied will be described. The Reinforcement Learning is a learning in which an agent (agent of action) in a certain environment observes a current state and determines an action to be taken. The agent obtains a reword from the environment by selecting actions, and learns a measure for obtaining the maximum reward through a series of actions. Examples of the known representative measure for the Reinforcement Learning include Q-learning and TD-learning. For example, in the Q-learning, a general update expression (action value table) of action value function Q (s, a) is expressed by Expression 1.

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In Expression 1, $s_t$ is an environment at time t, and $a_t$ is an action at time t. The environment is changed to $s_{t+1}$ by the action $a_t$. $r_{t+1}$ is a reward that is given by the variation of the environment, γ is a discount factor, and α is a learning coefficient. When the Q-learning is applied, the excitation current command increment ΔI and the excitation start timing adjusting amount Δt correspond to the action $a_t$.

Figure 4:
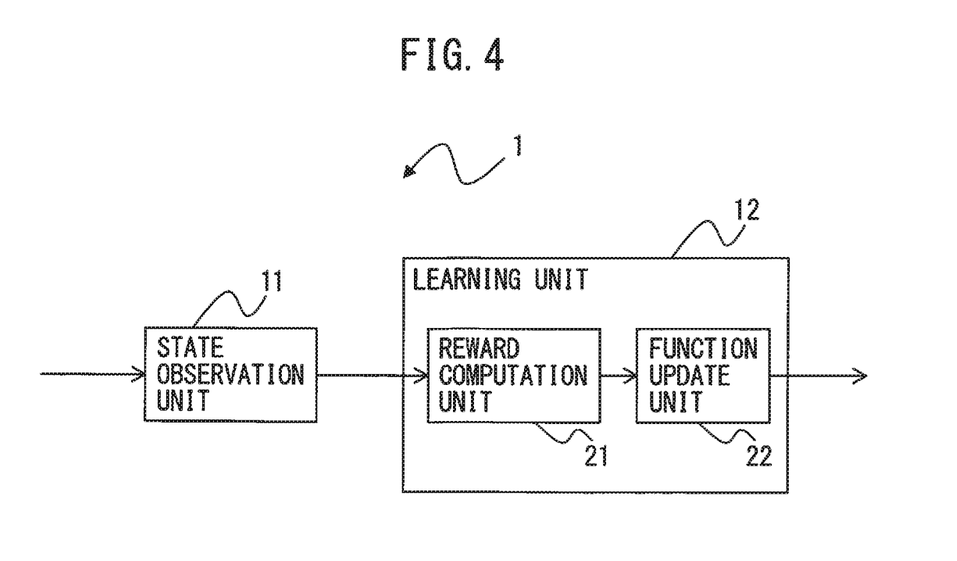
FIG. 4 is a block diagram illustrating a principle of the machine learning apparatus that employs Reinforcement Learning according to the embodiment.

FIG. 4 is a block diagram illustrating a principle of the machine learning apparatus that employs the Reinforcement Learning according to the embodiment. The learning unit 12 includes a reward computation unit 21 and a function update unit 22. The reward computation unit 21 computes the reward based on the state variable. The function update unit 22 updates the function for changing the excitation current command increment ΔI and the excitation start timing adjusting amount Δt based on the reward. For example, in the Q-learning, the action value function Q (s, a) expressed by Expression 1 is used as the function for changing the excitation current command increment ΔI and the excitation start timing adjusting amount Δt, which correspond to the action $a_t$. The components other than those described above are the same as those depicted in FIG. 1, and thus the same components are denoted by the same reference numerals, and detailed description of the corresponding components are omitted.

Figure 5:
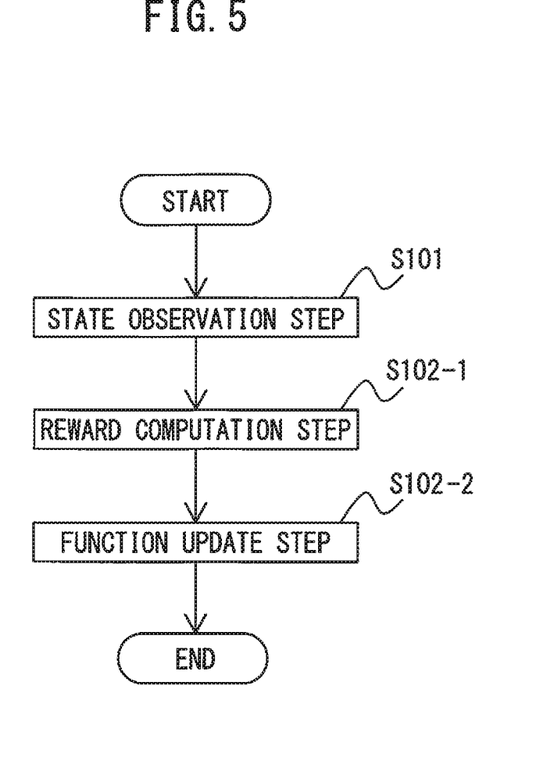
FIG. 5 is a flowchart illustrating the operation flow of the machine learning method that employs the Reinforcement Learning according to the embodiment.

FIG. 5 is a flowchart illustrating the operation flow of a machine learning method employing the Reinforcement Learning according to the embodiment.

In the state observation step S101, the state observation unit 11 observes the state variable including at least one of the data relating to the magnetic flux increase lead time that may be required from timing when the start command is issued for the predetermined operation mode until the magnetic flux of the motor reaches the maximum magnetic flux corresponding to the predetermined operation mode and the data relating whether the overheat alarm indicating that the motor has overheated has been triggered or not.

Subsequently, in a reward computation step S102-1, the reward computation unit 21 computes the reward based on the state variable observed in Step S101.

Subsequently, in a function update step S102-2, the function update unit 22 updates the function for changing the excitation current command increment ΔI and the excitation start timing adjusting amount Δt based on the reward.

Subsequently, a motor control apparatus provided with the above-described machine learning apparatus will be described. A case where the Reinforcement Learning is used as the learning algorithm of the learning unit will be described as an example.

Figure 6:
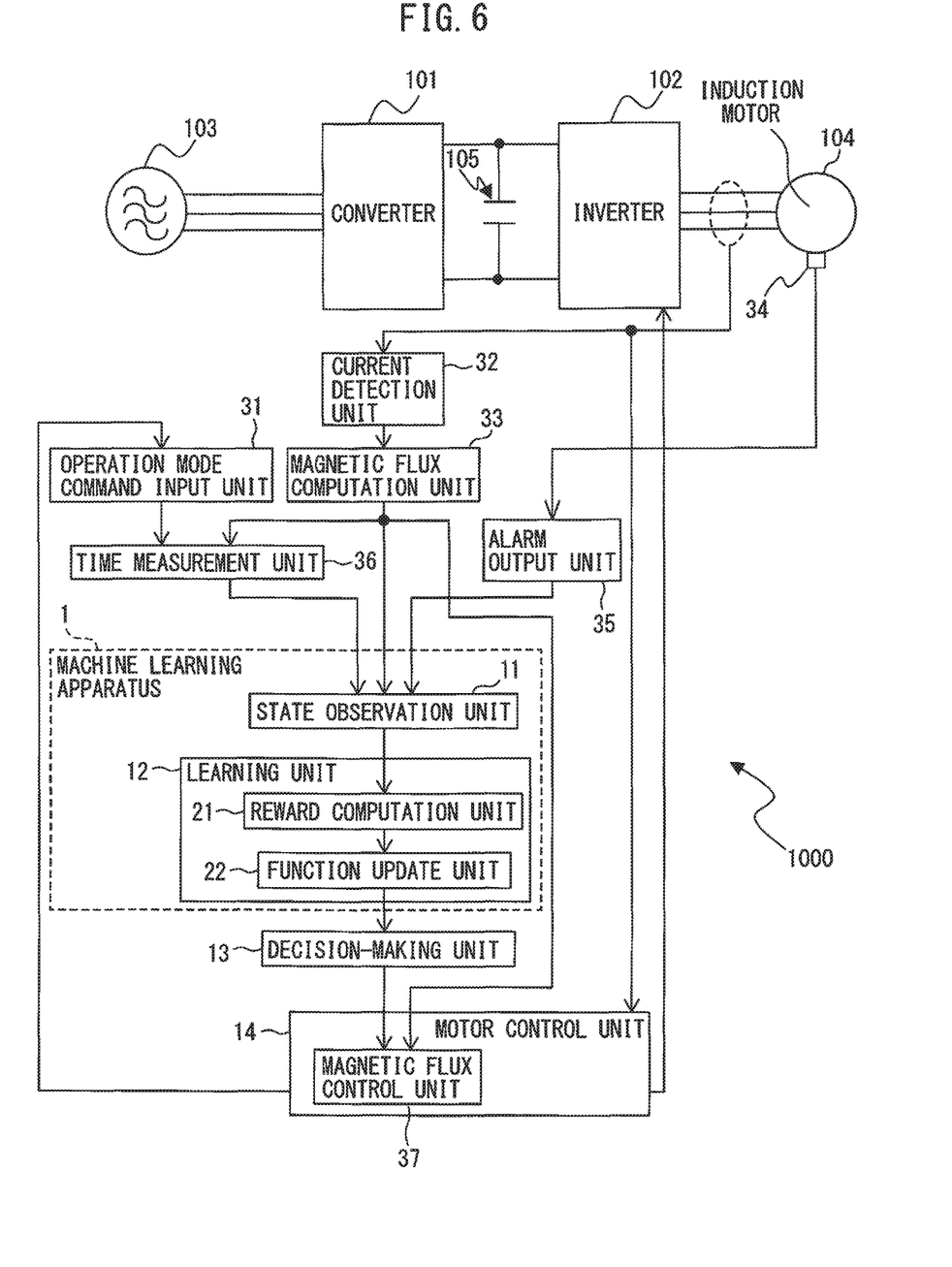
FIG. 6 is a principle block diagram illustrating a motor control apparatus provided with the machine learning apparatus according to the embodiment.

FIG. 6 is a principle block diagram illustrating the motor control apparatus provided with the machine learning apparatus according to the embodiment. A motor control apparatus 1000 that drives and controls a single induction motor 104 will be described. It is assumed that the low-load operation mode and the high-load operation mode are executed alternately as the operating mode of the induction motor 104.

The motor control apparatus 1000 includes a converter 101, an inverter 102, and a DC link capacitor 105 as a main circuit configuration thereof. An AC power supply 103 is connected to a three-phase AC input side of the motor control apparatus 1000, and the three-phase induction motor 104 is connected to an AC motor side of the motor control apparatus 1000.

The converter 101 converts an AC power supplied from the AC power supply 103 side into a DC power, and outputs the same to a DC link. In the invention, a mode of the converter 101 used herein is not specifically limited and includes, for example, a diode rectifier, or a rectification circuit that employs a PWM control system.

The inverter 102, being connected to the DC link for converting a DC power of the DC link into an AC power and supplying the same to the induction motor 104, is generally a power converter that is capable of converting to AC and DC powers in both directions. In other words, the inverter 102 is configured to be capable of converting power between the DC power of the DC link and the AC power which is a drive power or a regenerative power of the induction motor 104 in both directions, and performs either a regenerating operation (inverting operation) that converts the DC power to the AC power or a powered operation (converting operation) that converts the AC power to the DC power in accordance with a motor drive command received from the motor control unit 14. Specifically, the inverter 102 converts the DC power supplied from the DC link side into a desired voltage for driving the induction motor 104 and a three-phase AC power having a desired frequency by causing a switching element in the interior to perform a switching operation based on the motor drive command received from the motor control unit 14. Accordingly, the induction motor 104 operates based on a supplied voltage-variable and frequency-variable three-phase AC power. When the induction motor 104 is decelerated, the regenerative power is generated, and in this case, the AC regenerative power generated in the induction motor 104 is converted into the DC power and is returned back to the DC link based on the motor drive command received from the motor control unit 14. The inverter 102 includes, for example, the switching element such as a PWM inverter and a diode bridge circuit connected thereto in reverse-parallel fashion.

The motor control apparatus 1000 includes, as a control system and a measurement system thereof, the machine learning apparatus 1 that employs the Reinforcement Learning described in conjunction with FIG. 4 and FIG. 5, a decision-making unit 13, a motor control unit 14 including a magnetic flux control unit 37, an operation mode command input unit 31, a current detection unit 32, a magnetic flux computation unit 33, a temperature measurement unit 34, an alarm output unit 35, and a time measurement unit 36.

The operation mode command input unit 31 receives an input of a start command for the predetermined operation mode (high-load operation mode). In other words, the start command is a command for switching the operation mode of the induction motor 104 from the low-load operation mode to the high-load operation mode, and is supplied from the motor control unit 14.

The current detection unit 32 detects an actual current flowing in the induction motor 104.

The magnetic flux computation unit 33 computes the magnetic flux of the induction motor 104 from the actual current of the induction motor 104 detected by the current detection unit 32.

The temperature measurement unit 34 measures a temperature of the induction motor 104.

The alarm output unit 35 outputs an overheat alarm when the temperature measured by the temperature measurement unit 34 reaches an overheat temperature.

The time measurement unit 36 measures magnetic flux increase lead time, which corresponds to time that may be required for the magnetic flux of the induction motor 104 to reach the maximum magnetic flux corresponding to the predetermined operation mode from timing when the start command for the predetermined operation mode (high-load operation mode) is issued.

The motor control unit 14 includes the magnetic flux control unit 37 that controls a vector of the induction motor 104. The magnetic flux control unit 37 performs magnetic flux control for causing the magnetic flux of the induction motor 104 computed by the magnetic flux computation unit 33 to follow the magnetic flux corresponding to each of the operation modes. Detailed description of the motor control unit 14 will be given later.

The machine learning apparatus 1 includes the state observation unit 11 and the learning unit 12. The learning unit 12 includes the reward computation unit 21 and the function update unit 22.

The state observation unit 11 observes the state variable including at least one of the data relating to the magnetic flux increase lead time that may be required from timing when the start command is issued for the predetermined operation mode until the magnetic flux of the induction motor 104 reaches the maximum magnetic flux corresponding to the predetermined operation mode and the data relating whether the overheat alarm indicating that the induction motor 104 has overheated has been triggered or not. The observed state variable is used in learning by the learning unit 12 as the training data set. The magnetic flux increase lead time is measured by the time measurement unit 36 from the magnetic flux of the induction motor 104 computed by the magnetic flux computation unit 33. The overheat alarm is output from the alarm output unit 35.

The reward computation unit 21 in the learning unit 12 computes the reward based on the state variable measured by the state observation unit 11.

When the data relating to the magnetic flux increase lead time is employed as the state variable, the reward computation unit 21 increases the reward when the magnetic flux increase lead time observed by the state observation unit 11 falls within specified time when the state observation unit 11 observes that no overheat alarm has been triggered. The reward computation unit 21 also reduces the reward when the magnetic flux increase lead time observed by the state observation unit 11 is out of the specified time. The reason why the reward is increased when the magnetic flux increase lead time falls within the specified time and is reduced when the same is out of the specified time in this manner is that the shorter magnetic flux increase lead time means that the magnetic flux of the induction motor 104 is optimally controlled.

When the data relating whether the overheat alarm indicating that the induction motor 104 has overheated has been triggered or not is employed as the state variable, the reward computation unit 21 reduces the reward when the fact that the overheat alarm has been triggered by the state observation unit 11 is observed after the predetermined operation mode (high-load operation mode) has started. The reason why the reward is reduced when the fact that the overheat alarm has been triggered is observed in this manner is that the induction motor 104 has overheated because the magnetic flux generated in the induction motor 104 has been used as the result of learning by the machine learning apparatus 1, which is not preferable result of learning.

The function update unit 22 in the learning unit 12 updates the function for changing the excitation current command increment $\Delta I$ and the excitation start timing adjusting amount $\Delta t$ based on the reward computed by the reward computation unit 21. For example, in the Q-learning, the action value function Q (s, a) expressed by Expression 1 is used as the function for changing the excitation current command increment $\Delta I$ and the excitation start timing adjusting amount $\Delta t$.

The decision-making unit 13 decides the excitation current command increment $\Delta I$ and the excitation start timing adjusting amount $\Delta t$ in response to an input of the current state variable based on the result of learning that the learning unit 12 has learned in accordance with the training data set, and in the embodiment, since the Reinforcement Learning is employed as the learning algorithm as an example, the function update unit 22 in the learning unit 12 updates the function for changing the excitation current command increment $\Delta I$ and the excitation start timing adjusting amount $\Delta t$ based on the reward computed by the reward computation unit 21 in the learning unit 12, and the decision-making unit 13 selects the excitation current command increment $\Delta I$ and the excitation start timing adjusting amount $\Delta t$ which may provide the highest reward based on the updated function.

The magnetic flux control unit 37 in the motor control unit 14 may obtain a new excitation current command for the low-load operation mode by adding the excitation current command increment $\Delta I$ decided by the decision-making unit 13 to the preset excitation current command for the operating mode (low-load operation mode) before execution of the predetermined operation mode (high-load operation mode) (see FIG. 2A and FIG. 2B). The magnetic flux control unit 37 also employs time that precedes by $\Delta t$ the time when the operation mode of the induction motor is switched from the low-load operation mode to the high-load operation mode as new excitation start timing for the high-load operation mode (see FIG. 2A and FIG. 2B). In other words, the magnetic flux control unit 37 performs the magnetic flux control for causing the magnetic flux of the induction motor 104 computed by the magnetic flux computation unit 33 to follow the magnetic flux corresponding to the predetermined operation mode (high-load operation mode) based on the command obtained by adding the excitation current command increment $\Delta I$ decided by the decision-making unit 13 to the excitation current command preset for the operation mode (low-load operation mode) before execution of the predetermined operation mode (high-load operation mode) and the excitation start timing adjusted by the excitation start timing adjusting amount $\Delta t$ decided by the decision-making unit 13. The magnetic flux control unit 37 generates the magnetic flux command by the magnetic flux control.

The motor control unit 14 issues a command for either the powered operation (converting operation) for converting the AC power to the DC power or the regenerating operation (inverting operation) to the inverter 102 as the drive command for controlling the speed, the torque, or the position of a rotor of the induction motor 104 by using a predetermined velocity command, an operation program of the induction motor 104, an AC current or an AC voltage on the AC motor side of the inverter 102 and/or a rotating speed of the induction motor 104 based on the magnetic flux command generated by the magnetic flux control unit 37.

Figure 7:
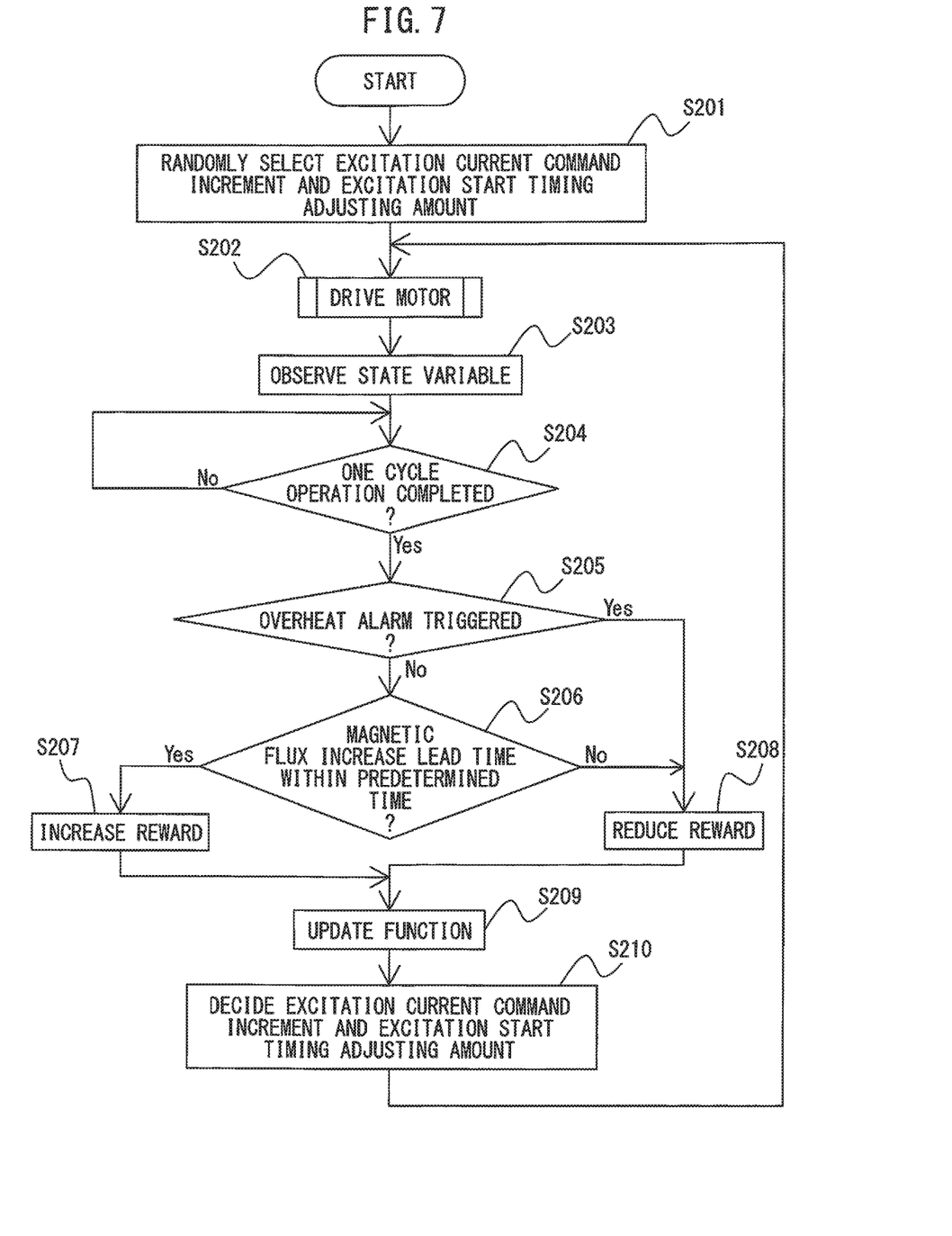
FIG. 7 is a flowchart illustrating an operation flow of the motor control apparatus provided with the machine learning apparatus that employs the Reinforcement Learning according to the embodiment.

FIG. 7 is a flowchart illustrating an operation flow of the motor control apparatus provided with the machine learning apparatus that employs the Reinforcement Learning according to the embodiment.

In general, in the Reinforcement Learning, an initial value of the action is randomly selected. In the embodiment, in Step S201, the excitation current command increment ΔI and the excitation start timing adjusting amount Δt, which are the actions, are randomly selected.

In Step S202, to the inverter 102, the motor control unit 14 issues the command for either the powered operation (converting operation) for converting the AC power to the DC power or the regenerating operation (inverting operation) to the inverter 102 as the drive command for controlling the speed, the torque, or the position of the rotor of the induction motor 104 by using the predetermined velocity command, the operation program of the induction motor 104, the AC current or the AC voltage on the AC motor side of the inverter 102 and/or the rotating speed of the induction motor 104 based on the magnetic flux command generated by the magnetic flux control unit 37 by using the preset excitation current command increment ΔI and the excitation start timing adjusting amount Δt. Accordingly, the induction motor 104 is driven. In the embodiment, the low-load operation mode and the high-load operation mode are alternately executed as the operation mode of the induction motor 104, and a set including the low-load operation mode and the high-load operation mode is determined as one cycle. Meanwhile, the current detection unit 32 detects the actual current flowing in the induction motor 104, the magnetic flux computation unit 33 computes the magnetic flux of the induction motor 104 from the actual current of the induction motor 104, the temperature measurement unit 34 measures the temperature of the induction motor 104, the alarm output unit 35 outputs the overheat alarm when the temperature measured by the temperature measurement unit 34 reaches the overheat temperature, and the time measurement unit 36 measures the magnetic flux increase lead time.

In Step S203, the state observation unit 11 observes the state variable including at least one of the data relating to magnetic flux increase lead time and the data relating whether the overheat alarm indicating that the induction motor 104 has overheated has been triggered or not. Although in the present embodiment these two data are employed as the state variable as an example, it is sufficient to employ at least one of the two data as the state variable.

In Step S204, whether or not one cycle composed of the low-load operation mode and the high-load operation mode has been completed is determined. The determination is executed by, for example, the motor control unit 14.

When it is determined that one cycle composed of the low-load operation mode and the high-load operation mode has been completed in Step S204, the procedure goes to Step S205.

In Step S206, the state observation unit 11 determines whether or not the overheat alarm, which indicates that the induction motor 104 has been overheated, has been triggered based on the data regarding whether or not the overheat alarm has been triggered. When the state observation unit 11 observes the overheat alarm, the reward computation unit 21 reduces the reward in Step S208. In contrast, when the state observation unit 11 does not observe the overheat alarm, the procedure goes to Step S206.

In Step S205, the state observation unit 11 determines whether or not the observed magnetic flux increase lead time falls within the specified time based on the data relating to the magnetic flux increase lead time. When the state observation unit 11 observes that the magnetic flux increase lead time falls within the specified time, the reward computation unit 21 increases the reward in Step S207. In contrast, when the state observation unit 11 observes that the magnetic flux increase lead time is out of the specified time, the reward computation unit 21 reduces the reward in Step S208.

In Step S209, the function update unit 22 updates the function for changing the excitation current command increment ΔI and the excitation start timing adjusting amount Δt based on the reward computed by the reward computation unit 21, based on the reward computed by the reward computation unit 21.

In the following Step S210, the decision-making unit 13 selects the excitation current command increment ΔI and the excitation start timing adjusting amount Δt which provide the highest reward based on the function updated in Step S209. Subsequently, the procedure goes back to Step S202 and, from then onward, the processes in Steps S202 to S210 are executed repeatedly. Accordingly, the machine learning apparatus 1 learns the excitation current command increment ΔI and the excitation start timing adjusting amount Δt which make the magnetic flux of the induction motor 104 optimum. The training data set may be acquired from a plurality of the converters 101 and, in this case, the learning unit 12 executes the processes in Steps S201 to S210 repeatedly and learns the excitation current command increment ΔI and the excitation start timing adjusting amount Δt in accordance with the training data set that is acquired for the plurality of converters 101. The learning accuracy of the machine learning apparatus 1 may further be improved by acquiring the training data set with respect to the plurality of converters 101.

The above-described state observation unit 11, the learning unit 12, and the decision-making unit 13 may be constructed, for example, in a software program format, or alternatively, may be constructed in a combination of the various electronic circuits and the software programs. For example, when the units as described above are constructed in the software program format, an arithmetic processing unit in the motor control apparatus 1000 is operated in accordance with the software program, so that the above-described functions of the respective units are achieved. Alternatively, the machine learning apparatus 1 provided with the state observation unit 11 and the learning unit 12 may be implemented as a semiconductor integrated circuit including a software program written therein which achieves the functions of the respective units. Alternatively, the machine learning apparatus 1 provided with the state observation unit 11 and the learning unit 12, as well as the decision-making unit 13 may be implemented as a semiconductor integrated circuit including a software program written therein which achieves the functions of the respective units.

Since a machine learning process according to the invention is executed by using data relating to the actual current of the induction motor 104 detected by the current detection unit 32 that is essentially provided on the motor control apparatus 1000 for drive control of the induction motor 104 and data relating to the temperature of the induction motor 104 measured by the temperature measurement unit 34, provision of a new hardware as in the related art may not be required, so that application to the corresponding existing motor control apparatus later is also possible. In this case, the semiconductor integrated circuit including a software program that achieves the functions of the respective units of the machine learning apparatus 1 and the decision-making unit 13 written therein may be integrated in the existing motor control apparatus, or a software program itself that achieves the functions of the respective units of the machine learning apparatus 1 and the decision-making unit 13 may be additionally installed on the arithmetic processing unit in the corresponding existing motor control apparatus. It is also applicable to mount the machine learning apparatus 1 which has learned the excitation current command increment $\Delta I$ and the excitation start timing adjusting amount $\Delta t$ for a certain motor control apparatus on another motor control apparatus to cause the same to re-learn and update the excitation current command increment $\Delta I$ and the excitation start timing adjusting amount $\Delta t$ for the corresponding another motor drive apparatus.

According to the invention, the motor control apparatus that controls the magnetic flux of the induction motor in an optimum fashion and allows elimination of the lead time for the magnetic flux to be increased, and the machine learning apparatus used for the motor control apparatus and the method thereof may be achieved.

According to the invention, since the machine learning apparatus learns by itself and adjusts the excitation current command increment to be added to the excitation current command for the motor, which is preset for the low-load operation mode, before execution of the high-load operation mode and the excitation start timing adjusting amount for adjusting the excitation start timing, which is preset for the high-load operation mode so that the magnetic flux of the induction motor is optimized for the motor control apparatus being operated, the magnetic flux of the induction motor driven in various operating patterns may be controlled easily in an optimum fashion.

According to the invention, the machine learning apparatus learns by itself and adjusts the excitation current command increment and the excitation start timing adjusting amount for adjusting the excitation start timing such that excitation is started before the time point when the operating mode of the induction motor is switched from the low-load operation mode to the high-load operation mode, and that the maximum magnetic flux that may provide the full torque is obtained at the time point when the operating mode is switched to the high-load operation mode, and consequently the magnetic flux increase lead time may be easily eliminated.

In the induction motor to which a high load and a low load are applied alternately, the magnetic flux may be required to be varied frequently in the magnetic flux control of the motor control apparatus, and according to the invention, the magnetic flux of the induction motor may be controlled in an optimum fashion and the lead time for the magnetic flux to be increased may be eliminated.

What is claimed is:

1. A machine learning apparatus configured to learn conditions that are associated with an excitation current command for magnetic flux control of a motor performed by a motor control apparatus and excitation start timing, which corresponds to timing to start increasing a magnetic flux by the magnetic flux control comprising:
   a state observation unit that observes a state variable including at least one of data relating to magnetic flux increase lead time that may be required from timing when a start command is issued for a predetermined operation mode until the magnetic flux of the motor reaches the maximum magnetic flux corresponding to the predetermined operation mode and data relating to whether an overheat alarm indicating that the motor has overheated has been triggered or not; and
   a learning unit that learns conditions that are associated with an excitation current command increment to be added to the excitation current command for the motor, which is preset for an operation mode before execution of the predetermined operation mode, and an excitation start timing adjusting amount for adjusting the excitation start timing, which is preset for the predetermined operation mode, in accordance with a training data set including the state variables.

2. The machine learning apparatus according to claim 1, wherein the learning unit comprises:
   a reward computation unit that computes the reward based on the state variable; and
   a function update unit that updates the function for changing the excitation current command increment and the excitation start timing adjusting amount based on the reward.

3. The machine learning apparatus according to claim 2, wherein the reward computation unit increases the reward when the magnetic flux increase lead time observed by the state observation unit falls within specified time when the state observation unit observes that no overheat alarm has been triggered.

4. The machine learning apparatus according to claim 2, wherein the reward computation unit reduces the reward when the magnetic flux increase lead time observed by the state observation unit is out of the specified time.

5. The machine learning apparatus according to claim 2, wherein the reward computation unit reduces the reward when the fact that the overheat alarm has been triggered is observed after the predetermined operation mode has started.

6. The machine learning apparatus according to claim 1, wherein the learning unit is configured to learn the conditions in accordance with the training data set acquired for a plurality of the motor control apparatus.

7. A motor control apparatus comprising the machine learning apparatus according to claim 1, further comprising:
   an operation mode command input unit that receives an input of a start command for the predetermined operation mode;
   a current detection unit that detects actual current flowing in the motor;
   a magnetic flux computation unit that computes a magnetic flux of the motor from the actual current of the motor detected by the current detection unit;
   a temperature measurement unit that measures a temperature of the motor;
   an alarm output unit that outputs an overheat alarm when the temperature measured by the temperature measurement unit reaches an overheat temperature;
   a time measurement unit that measures the magnetic flux increase lead time;
   a magnetic flux control unit that performs magnetic flux control for causing the magnetic flux of the motor computed by the magnetic flux computation unit to follow the maximum magnetic flux corresponding to the predetermined operation mode; and a decision-making unit that decides the excitation current command increment and the excitation start timing adjusting amount in response to an input of the current state variable based on the result of learning that the learning unit has learned in accordance with the training data set, wherein the magnetic flux control unit performs the magnetic flux control based on a command obtained by adding the excitation current command increment decided by the decision-making unit to the excitation current command and excitation start timing adjusted by the excitation start timing adjusting amount decided by the decision-making unit.

8. The motor control apparatus according to claim 7, wherein the learning unit is configured to update conditions by re-learning the conditions in accordance with an additional training data set including the current state variable.

9. A machine learning method configured to learn conditions that are associated with an excitation current command for magnetic flux control of a motor performed by a motor control apparatus and excitation start timing, which corresponds to timing to start increasing a magnetic flux by the magnetic flux control comprising:

a state observation step for observing a state variable including at least one of data relating to magnetic flux increase lead time that may be required from timing when a start command is issued for a predetermined operation mode until the magnetic flux of the motor reaches the maximum magnetic flux corresponding to the predetermined operation mode; data relating whether an overheat alarm indicating that the motor has overheated has been triggered or not; and a learning step for learning conditions that are associated with an excitation current command increment to be added to the excitation current command for the motor, which is preset for an operation mode before execution of the predetermined operation mode, and an excitation start timing adjusting amount for adjusting the excitation start timing, which is preset for the predetermined operation mode, in accordance with a training data set including the state variables.

* * * * *